(12) United States Patent
Weber et al.

(10) Patent No.: US 8,060,780 B2
(45) Date of Patent: Nov. 15, 2011

(54) TRANSIENT TRANSACTION EXECUTION WITH ON-DEMAND PERSISTENCY

(75) Inventors: Franz Weber, Wiesloch (DE); Matthias Miltz, Heidelberg (DE); Sören Balko, Weinheim (DE)

(73) Assignee: SAP AG, Walldorf (DE)

( * ) Notice: Subject to any disclaimer, the term of this patent is extended or adjusted under 35 U.S.C. 154(b) by 264 days.

(21) Appl. No.: 12/336,501

(22) Filed: Dec. 16, 2008

(65) Prior Publication Data
US 2010/0153778 A1    Jun. 17, 2010

(51) Int. Cl.
*G06F 11/00* (2006.01)
(52) U.S. Cl. .......................................... 714/16; 709/203
(58) Field of Classification Search .................. 714/16
See application file for complete search history.

(56) References Cited

U.S. PATENT DOCUMENTS

| | | | |
|---|---|---|---|
| 5,721,918 A * | 2/1998 | Nilsson et al. ........................ 1/1 |
| 6,920,467 B1 * | 7/2005 | Yoshimoto ............... 707/999.01 |
| 6,988,170 B2 * | 1/2006 | Barroso et al. ................ 711/141 |
| 7,020,880 B2 * | 3/2006 | Mellen-Garnett et al. .... 719/310 |
| 7,197,533 B2 * | 3/2007 | Vincent et al. ................ 709/203 |
| 7,469,256 B1 * | 12/2008 | Manolov et al. ........................ 1/1 |
| 7,607,130 B2 * | 10/2009 | Singh et al. .................... 718/107 |
| 2004/0006538 A1 * | 1/2004 | Steinberg et al. ............... 705/39 |
| 2004/0177111 A1 * | 9/2004 | Vincent et al. ................ 709/203 |
| 2005/0276217 A1 * | 12/2005 | Gadgil et al. .................. 370/225 |
| 2006/0036713 A1 * | 2/2006 | Araujo et al. .................. 709/220 |
| 2008/0270838 A1 * | 10/2008 | Dorai et al. ...................... 714/38 |
| 2009/0013122 A1 * | 1/2009 | Sepe et al. ..................... 711/103 |
| 2009/0164985 A1 * | 6/2009 | Balko et al. ................... 717/162 |
| 2009/0327199 A1 * | 12/2009 | Weber et al. ..................... 706/48 |
| 2010/0115579 A1 * | 5/2010 | Rensin et al. ..................... 726/1 |
| 2010/0138842 A1 * | 6/2010 | Balko et al. ................... 718/107 |
| 2010/0146243 A1 * | 6/2010 | Balko et al. ..................... 712/33 |

OTHER PUBLICATIONS

Forgy, Charles L., "Rete: A Fast Algorithm for the Many Pattern/Many Object Pattern Match Problem", Artificial Intelligence, 19: 17-37 (1982).
Li et al., "Multiprocessor Main Memory Transaction Processing", International Symposium on Databases in Parallel and Distributed Systems, pp. 177-187 (1988).
Elmasri, Ramez et al., "Fundamentals of Database Systems", published by Addison-Wesley, Chapter 21, pp. 689-711.

* cited by examiner

*Primary Examiner* — Scott Baderman
*Assistant Examiner* — Kamini Patel
(74) *Attorney, Agent, or Firm* — Mintz, Levin, Ferris, Glovsky and Popeo, P.C.

(57) ABSTRACT

The subject matter disclosed herein provides methods and apparatus, including computer program products for handing transactions. The method may include, for example, processing, at a state correlation engine, a plurality of transactions; saving the effects of at least one of the transactions to a persistence, when the at least one transaction includes a reliable interaction with an external application; saving other transactions to a buffer rather than to the persistence; and reading the at least one transaction from the persistence and continuously executing rules representing the other transactions in response to a failure causing a recovery. Related systems, apparatus, methods, and/or articles are also described.

14 Claims, 4 Drawing Sheets

TRANSIENT TRANSACTION EXECUTION WITH ON-DEMAND PERSISTENCY

FIELD

This disclosure relates generally to data processing and, more particularly, to rules-based processing and handling associated transactions.

BACKGROUND

Event Condition Action (ECA) is an example of a rules-based approach used in an event driven system, such as a database system. Typically, the ECA rule includes an event part for specifying what triggers the invocation of the ECA rule, a condition part, which is a logical test that, if satisfied to true, causes the action to be carried out, and an action part, which includes updates or invocations on the local data at the database. In a database system, the condition could simply be a query to the database, with the result set being passed to the action part for changes to the database. Actions could also be calls to external programs or remote procedures. ECA rules can be used for activities such as automatically enforcing document constraints, maintaining repository statistics, running business processes, and facilitating publish/subscribe applications.

SUMMARY

The subject matter disclosed herein provides methods and apparatus, including computer program products, for rules-based processing and handling associated transactions.

In one aspect there is provided a method. The method may include, for example, processing, at a state correlation engine, a plurality of ECA rules, associated with transactions; saving at least one of the transactions to a persistence, when the at least one transaction includes receiving, or sending, an event from, or to, an external application; saving other transactions to a transient main memory buffer rather than to the persistence; and, in a recovery case, reading the committed effects of the at least one transaction from the persistence and executing the ECA rules representing the other buffered transactions.

Articles are also described that comprise a tangibly embodied machine-readable medium embodying instructions that, when performed, cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWING

These and other aspects will now be described in detail with reference to the following drawings.

Like reference symbols in the various drawings indicate like elements.

DETAILED DESCRIPTION

Figure 1:
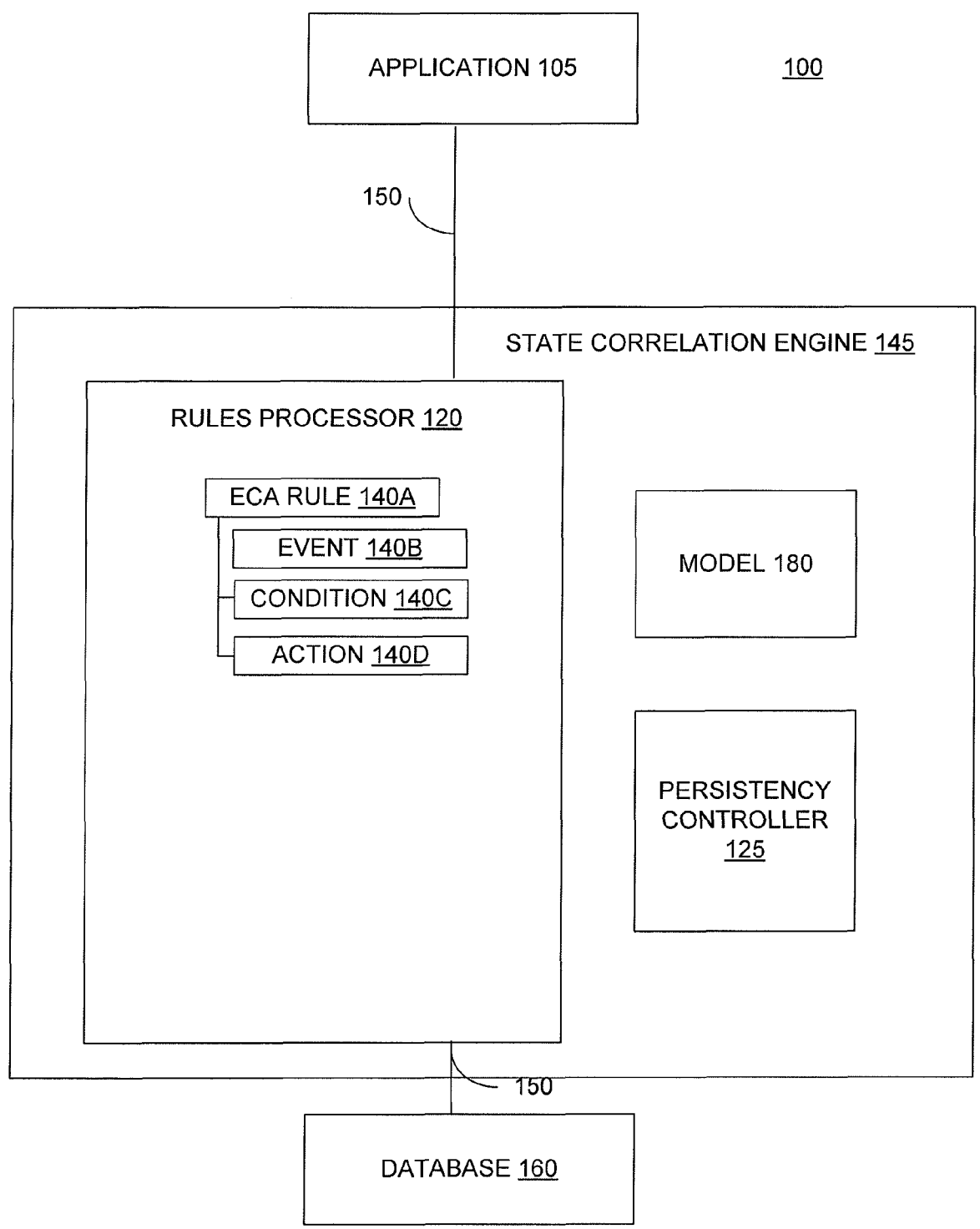
FIG. 1 illustrates a system 100 including a persistency controller 125 configured to control the persistency of transactions.

FIG. 1 depicts a system 100 including an application 105, a state correlation engine 145 including a rules processor 120, and a database 160, all of which are coupled by a communication mechanism 150, such as the Internet, an intranet, and the like. The state correlation engine 145 further includes a persistency controller 125. The persistency controller 125 provides transient execution of event-condition-action (ECA) rules, where the action part runs in a transaction which buffers the effects (e.g., state changes) to transient main memory rather than persisting the effects to a database. However, the persistency controller 125 selectively persists (e.g., persists on-demand) rule effects at database 160. The effects refer to state variable changes caused by the action part of that rule.

System 100 and, in particular, persistency controller 125 addresses the problems faced by reliable business applications, which often suffer from poor performance. This poor performance is because each atomic step (e.g.; a single ECA rule) is traditionally bound to a separate database transaction, which persists its effects (state variable changes) to a database. Atomic step refers to a transaction executing an ECA rule, such as a commit, in which all changes (e.g., operations) of a database transaction occur within a single transaction or none of the changes of the transaction occurs. By recovering from a database transaction that has been persisted and then continuously re-executing those rules that have transiently buffered their effects in main memory, a business application may achieve consistent behavior with failover guarantees. Specifically, when there is a failure (such that the rule engine ceases operations and needs to be restarted), the business application (which may be represented as set of ECA rules) may use persistency (e.g., a database) to recover from the persisted state to achieve deterministic execution of the business application. However, this extensive use of persistency for ECA rules being the atomic steps of the business application comes at the cost of performing the corresponding repeated input/output operations to persistency (e.g., a disk including database 160) and committing the transaction to persistency (which manifests as an update to the disk or other like storage mechanism). In some implementations, the persistency controller 125 addresses some of these problems by buffering, by default, some transactions rather than persisting all of the transactions. Moreover, the persistency controller 125 selectively persists to disk some transactions to maintain reliable operation including the failover guarantees, such as recovery.

In the recovery case, re-executing of transient transactions (whose effects were lost in the failure) typically relies on continuous execution of rules, as noted herein. For example, the transactions represent a rule chain where one rule's effect enables the next rule and so on. At recovery, a system state is fetched from the last save point (which occurred when a persistent transaction is committed) and then the usual transactional rule execution roundtrip kicks in, i.e. from there on the successive rules continuously execute and restore the system state.

Moreover, at a savepoint (which occurs when a persistent transaction commits), both the effects of this transaction and the effects of all the committed transient transactions are written to the database. The savepoint acts as a joint database commit for the entire system state (e.g., all changes that have happened within all transactions since the last save point are persisted).

Application 105 may be implemented as any type of application, which may access (e.g., update, change, and the like) a persistency mechanism, such as database 160.

Database 160 may be implemented as any type of storage mechanism, such as a disk, that provides persistent storage. In the implementation of FIG. 1, database 160 is implemented as one or more of a relational database, an XML database (e.g., a data persistence software system that allows data to be imported, accessed and exported in the extensible markup language (XML) format), and the like.

State correlation engine 145 may be implemented on a processor, such as a computer, a server, a blade, and the like, and include memory as well as a buffer for buffering database transactions (also referred herein as transactions).

The rules processor 120 may be implemented as an event, condition, action ("ECA") rules processor. The rules processor 120 processes one or more rules (e.g., ECA rule 140A), parses each of the rules into an event part, a condition part, and an action part, as described further below. Moreover, the rules processor 120 may be used to process ECA rules, as described further below. Rules processor 120 may define ECA rules, remove ECA rules, activate ECA rules, deactivate ECA rules, search ECA rules, browse ECA rules, persist ECA rules, and the like.

For example, rules processor 120 may parse ECA rule 140A into one or more events 140B, a condition 140C, and an action 140D. As such, event module 120B detects an event 140B, and condition module 120C evaluates a condition 140C (e.g., evaluate conditional expressions). If the condition 140C of the ECA rule 140A is satisfied, then operations, such as action 140D, associated with ECA rule 140A may be executed. For example, in the asynchronous case, the action part is solely enabled (i.e., instantiated and put into the "ready" set containing the actions of all rules whose condition currently holds atop the system state) from where it is asynchronously scheduled for execution (i.e., executed by an action module). Next, the action module of the rules processor may perform one or more actions specified by the rules.

In some implementations, state correlation engine 145 may continuously evaluate event-condition-action (ECA) rules and trigger follow-up transactions associated with these rules. The state correlation engine 145 may be a component of a business process management (BPM) system, a complex event processing (CEP), a business activity monitoring (BAM) system, a business rules management (BRM) system, and any other system using at least one of rules, conditions, and events. The state correlation engine 145 may execute models (sets of ECA rules which would be included in model module 180) representing the semantics of a business process or other high-order paradigms.

The state correlation engine 145 may provide for continuous execution of rules, which are continuous in the sense that execution of rules may be triggered by the execution of earlier rules, which may result in further execution of rules. For example, a first rule R1 having a first action A1 may be executed as a result of a first event E1. Execution of the first rule R1 may result in the execution of the action A1, where the action A1 involves changing a state variable V1 from a value L1 to another value L2. The change of the state variable V1 may cause a state correlation engine to generate an event E2 that includes a before image with V1 as a value L1 and an after image with V1 as a value L2. The event E2 may be flooded in all rules, which may cause a second rule R2 to be executed, where the second rule R2 requires the event E2 (or multiple events) before it to be executed. As a result of the execution of R2, a second action A2 may be executed, which may result in an event E3, which may, in turn, cause another rule to be executed. For example, in FIGS. 2-3, this mechanism is in place, so that rule 1 (executing within transaction TX1) triggers rule 2 (executing within transaction TX2), and so forth.

The state correlation engine 145 may further provide for stateful execution of ECA rules in the sense that a state of execution may be retained across execution of ECA rules (e.g., information about state may be retained across execution of ECA rules and changed according to actions of rules or, otherwise, as a result of events). State may be retained by a combination of one or more of state variables of instances of objects of a type language, retaining a state of selections of condition network channels within rules, and a state of operator nodes.

Although the term event may be used in the following description to refer to an event object, which may be an object of an object-oriented or other type of data structure of another type of computer-implemented language (where the event object may be implemented as a combination of images of objects of a type language), the term event may also refer to an event in a broader sense, which may be an occurrence or happening. For example, an event may be the receipt of a message or call that may cause the generation of an event object (which may also be referred to as an event). Some events may originate from a connected application (i.e., are sent to the rules processor by an adapter) or are sent from the rules processor to a backend application through an adapter.

As noted above, persistency controller 125 controls the transient execution of transactions by buffering effects of transactions (e.g., internal state variable changes and events that are received from or sent to connected applications) to transient main memory rather than persisting transactions to disk. Moreover, this buffering may be implemented as a default. However, the persistency controller 125 selectively persists one or more transactions to disk. For example, the persistency controller 125 may persist to disk, such as database 160, a transaction that occurs due to an event received from, or sent to, an external system, such as application 105. An example of persisting a transaction in this context is a backend application triggering an adapter to send an event to the rules processor (also referred to as a rules engine). Whenever the backend application enforces reliable communication, the transaction, in which the adapter creates, alters, or deletes a state variable, is typically made persistent. Another example of persisting the transaction is a rule action interacting with a backend application (e.g., sending an event through an adapter), causing the backend application to change an external state. Another example of persisting the transaction is state eviction, i.e., the rules processor displaces certain state variables from main memory to the database. Apart from the eviction example, it is typically a function of an adapter to flag a transaction to become persistent. That is, the adapter determines when sending or receiving an event to, or from, the rules processor if that particular event originates from an interaction with the backend application. If that is the case, the adapter typically marks the respective transaction as persistent. Despite receiving or sending an event to an external application, the adapter may, however, also not mark the transaction as persistent. The adapter may specifically choose to do so whenever it is entangled with the connected application though a non-reliable communication to send or receive events (e.g., best-effort messaging, such as sending emails or invoking stateless, synchronous Web Services). On the contrary, the adapter will mark transactions as persistent in case of reliable communication with the connected application, which includes asynchronous reliable messaging (e.g., through the Web Services Reliable Messaging (WS-RM) protocol) or synchronous, transactional calls (e.g., using the Web Services Transactions (WS-Tx) protocol). The persistency controller 125 may thus be used to provide a reliable and consistent mechanism to execute rule-based applications, while providing transactional guarantees for continuous rule execution to provide relatively good performance with relatively small execution latencies (e.g., a single transient rule requires little time to execute).

As noted, system 100 and, in particular, persistency controller 125 implements persistency in a selective manner, so that state changes caused by a transaction are transiently buffered primarily in main memory rather than a disk. Moreover, persistency controller 125 persists to disk only a selected subset of the transactions (and their corresponding state changes). Specifically, a persistent transaction enforces a "save point" which jointly saves all effects (e.g., state changes) of the committed transient rules. By default, transactions will thus not perform any database accesses to materialize their effects on disk.

For example, given continuously executed rules, technically represented as a chain of transactions (in which a transaction may include one or more changes, such as operations to database 160), the selected subset of changes stored to a disk to provide persistency may include those changes associated with receiving an event and also the effects of the above-described committed transient transactions (e.g., a batch commit). For example, a message including the event may be received from an external system (e.g., application 105), while subsequent transactions (and associated actions) are buffered to memory rather than persisted to the disk. If the chain of transactions also includes an action to an external system (e.g., an output message to an application 105 external to the database 160), then that transaction may be persisted to disk. If there is a failure, the state correlation engine 145 starts executing the chain of transactions from the last save point, which is the transaction saved to disk, and executes (e.g., re-executes) the other transient transactions (which were not persisted and thus not accessible from the buffer due to the failure). Moreover, the logic behind the re-execution comprises continuous execution of ECA rules within separate transactions. For example, follow-up ECA rules re-execute using the continuous evaluation of rules approach noted above. System 100 may thus be able to reduce the number of persisted transactions and maintain a recovery capability in the event of a failure.

In some implementations, a transaction may be marked as persistent, which will cause the rules processor 120 to open a regular database transaction writing out all state variables that have changed since the last save point. In this way, the system 100 describes a layered execution model where regular transactions buffer up state changes in transient, main memory from where it is later written out to a database, which resides in persistent, secondary storage (e.g., on disk). Whether or not a transaction is marked as persistent, and thus, acts as a save point depends on the dedicated actions it performs. That is, whenever an action cannot be repeated or rolled back (e.g., because it has reliably received from, or triggers an event in, an external system, the transaction is marked as persistent. Moreover, even when there is interaction with a backend system, there may be cases when a respective rule is not persisted. For example, if the interaction with the backend does not require reliability guarantees (e.g., best effort messaging such as email) or is stateless (e.g., synchronous Web Service calls), system 100 may safely avoid persistency.

In any cases, these transactions which are selectively persisted may include, for example, one or more of the following: an adapter receives message from a reliable messaging backend (e.g., through WS-RM) and creates a state variable representing this message (e.g., for launching a business process); and rules for performing an activity that invokes a transactional Web Service (e.g., WS-Tx) at an enterprise resource planning (ERP) system. Examples of non-persistent transactions include rules that solely operate on internal state (e.g., rules to implement process gateways, loops, and the like); and rules which do interact with a backend application but without transactional guarantees (e.g., for sending an email or invoking a stateless, synchronous Web Service).

Figure 2:
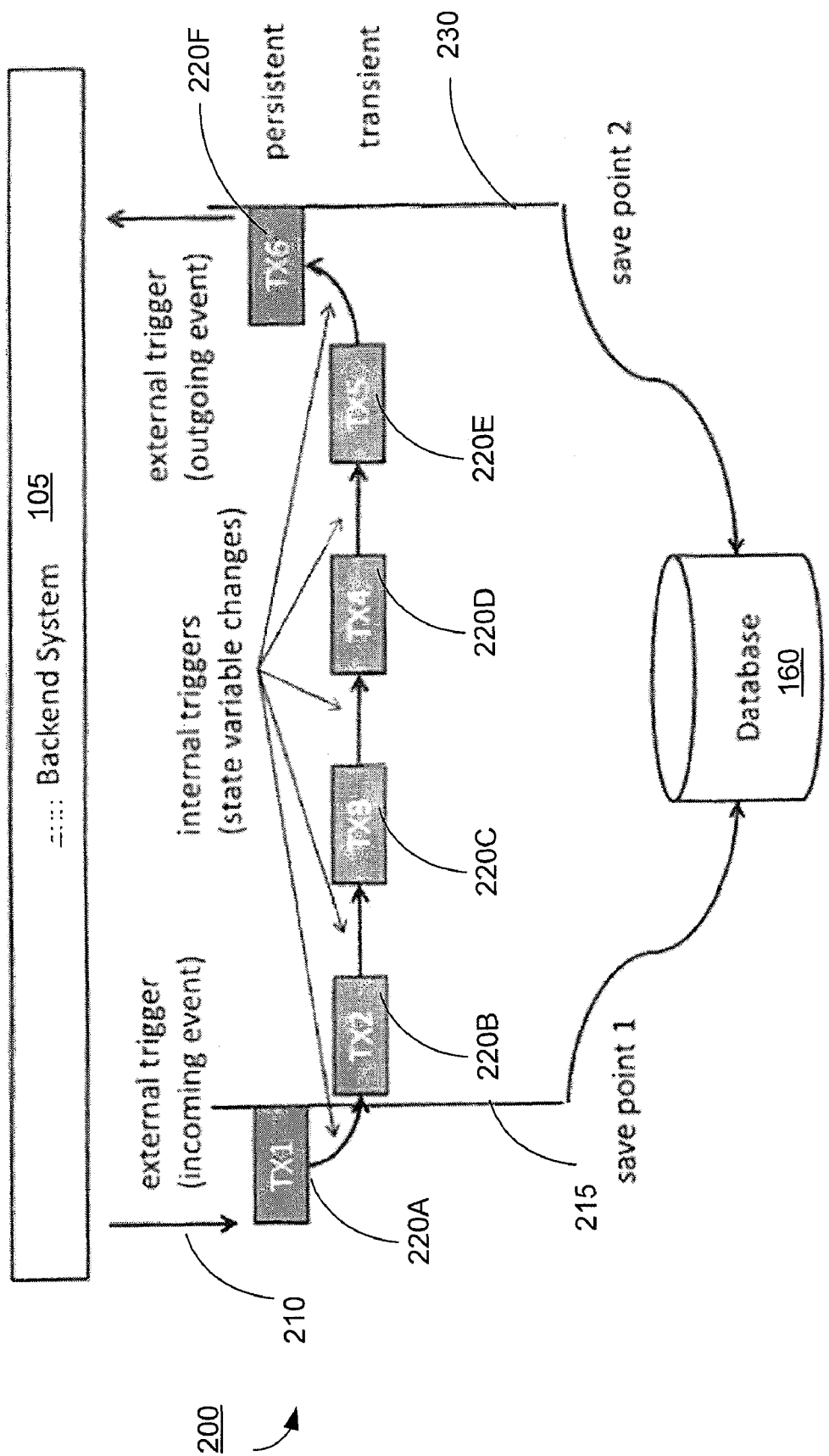
FIG. 2 illustrates transactions selectively persisted to database 160.

FIG. 2 depicts a process 200 for processing transactions using system 100. At 210, the application 105 (labeled backend system) provides an event 210 reliably within a database transaction. The event is propagated to state correlation engine 145 (in some cases alongside other events) within a newly opened internal transaction 220A. Persistency controller 125 persists to database 160 transaction 220A (labeled TX1) because the transaction 220A is associated with an event (which is flagged as an event of an ECA rule) from an external application 105. The saving of transaction 220A is depicted at save point 215.

FIG. 2 also depicts transactions 220B-220E (labeled TX2, TX3, TX4, and TX5), which represent continuously executed ECA rules that are transitively enabled and continuously executed. These transactions 220B-E are, by default, not saved to disk at database 160 but instead buffered in the transient main memory of state correlation engine 145 (or a server hosting state correlation engine 145).

However, persistency controller 125 persists transaction 220F to database 160 to provide persistency, as depicted at save point 230. Thus, persistency controller 125 selectively persists transactions 220A and 220F on-demand (e.g., 220A and 220F are marked as persistent by an adapter in response to receiving and/or sending an external event) because these so-called "external events" implicitly (through an adapter) trigger persistence to a storage mechanism, such as database 160; while transactions 220B-E are so-called "default transient transactions," which are merely buffered to main memory.

If a failure occurs between transaction 220C-D, state correlation engine 145 rolls back to the state saved at save point 215 by reading the state (e.g., variables and other information related to the transaction 220A saved at save point 215 to disk at database 160).

Next, state correlation engine 145 re-executes the transactions 220B-D starting with transaction 220B using continuous execution of rules where the results of transaction 220A enable the rule executing in transaction 220B, whose effects enable the rule executing in transaction 220C and so on. In some implementations, a rule refers to a model entity that denotes the actual action that is to be executed when the corresponding condition holds. At runtime, rules may be executed within a transactional roundtrip, starting with the action being executed and resulting in state variable changes (and, in some cases, external events being triggered), re-evaluating the conditions of potential follow-up rules, and inserting those follow-up rule actions into the "ready" set whose condition holds atop the (changed) system state. The engine may continuously pick actions from the "ready" set, and asynchronously execute them in a separate transaction, thus, initiating a new roundtrip. On the other hand, if an error occurs after transaction 220F has successfully committed, state correlation engine 145 may be able to roll back to transaction 220F (given save point 230) by reading the persisted state (e.g., variables and other information related to the transactions 220B-F saved at save point 230 to disk at database 160). Although state correlation engine 145 has to re-execute successive transient transactions when a failure happens and a recovery case occurs, state correlation engine 145 may have an improved overall performance profile, when compared to approaches that persist all of the transactions separately to database 160.

Although FIG. 2 depicts a single back end system 105, there may be a plurality of backend systems (which may be wrapped through adapters) to interact with the rule engine (e.g., an incoming event and outgoing event do not necessarily originate from, or end up at, the same backend application).

Figure 3:
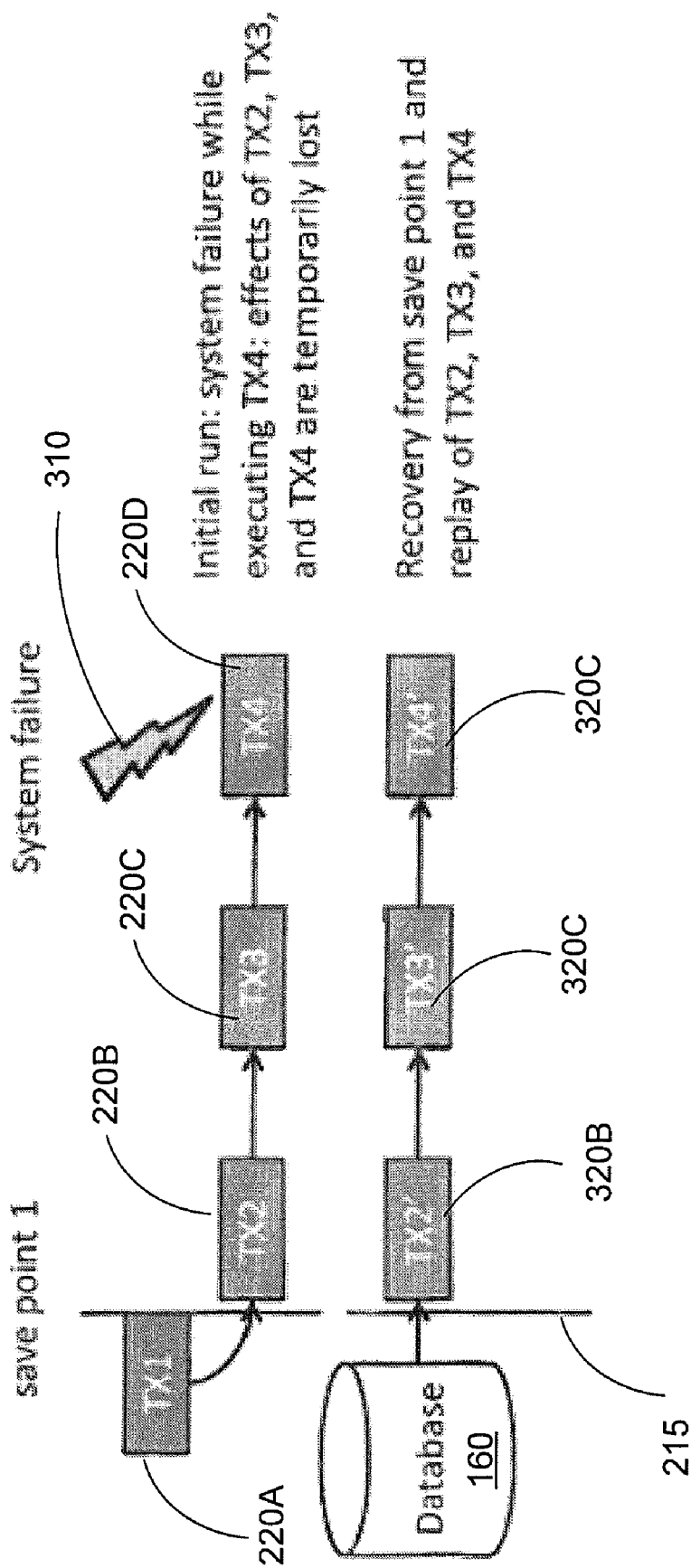
FIG. 3 provides an example of a failure during a chain of transactions.

FIG. 3 further illustrates a failure 310 and the process that occurs. A failure may include anything that lets the rules processor cease its regular operations (e.g., a hardware failures, a system software failure causing a shutdown of the rule engine, a power outage, unhandled software faults in the underlying application layers, and the like). Referring to FIG. 3, state correlation engine 145 executes transaction 220A (as described above with respect to FIG. 2); the transaction 220A corresponds to an event from an external system, such as application 105, and corresponds to an event of the rules processor (also referred to as a rules engine). As such, transaction 220A is persisted to database 160 at save point 215. State correlation engine 145 then processes transactions 220B-220D representing continuously executed follow-up rules, all of which are buffered, by persistency controller 125, as transient transactions and, thus, not stored to disk at database 160 to provide persistency. At 310, a failure occurs which may result in the loss of data associated with transient transactions 220B-D. Persistency controller 125 then retrieves the system state (e.g., the set of internal state variable values) stored at database 160 at save point 215 (when transaction 220A has committed). The state correlation engine 145 then executes transactions 320B-D (which represent the re-execution of the rules that were run before by transactions 220B-D before the failure happened) and any other subsequent transaction in the transaction chain.

Figure 4:
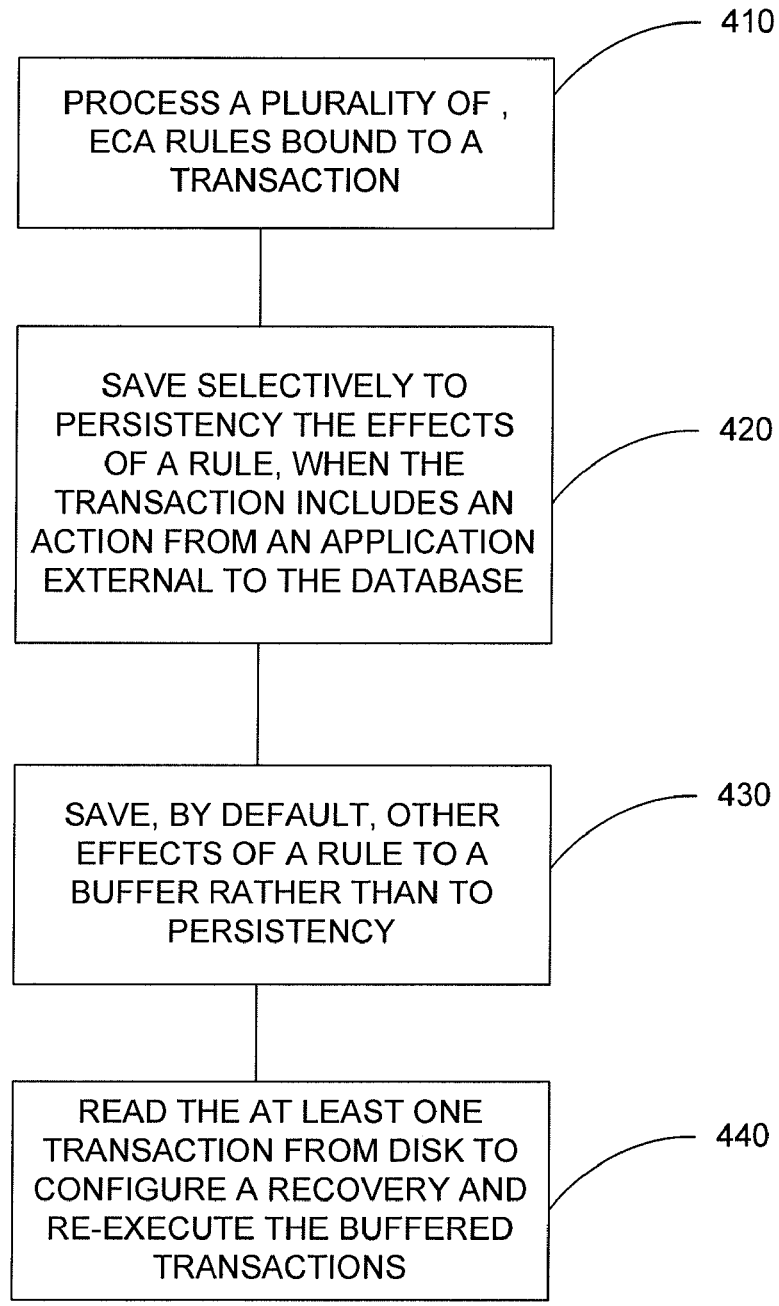
FIG. 4 depicts a process 400 for using persistency controller 125.

FIG. 4 depicts a process 400 for transient transaction execution with selective persistency of transactions.

At 410, a plurality of transactions is processed. For example, the transactions may correspond to transaction 220A-F. These transactions (e.g., a plurality of ECA rules may be bound to a transaction) may correspond to ECA rules processed by state correlation engine 145 and, in particular, persistency controller 125.

At 420, a transaction is selectively persisted to disk. For example, the effects of this transaction and all the previously committed transient transactions are jointly persisted at a so-called "savepoint." For example, at least one of the transactions may be persisted to disk. The transaction may include reliable interactions (e.g., an asynchronous reliable Web Service call through, for example, the WS-RM protocol, or a synchronous, transactional Web Service call through, for example, the WS-Tx protocol) with an external backend system, such as application 105, and, when that is the case, persistency controller 125 may persist that transaction to database 160. The persistency of the transaction enables recovery if a failure should occur. The effects of a rule are persisted when the action part of a rule includes an interaction with a backend application (rather than just altering internal state variables).

At 430, other transactions are buffered to transient main memory rather than saved to disk. These buffered transactions are referred to as transient transactions since effects of the rule actions corresponding to those transactions are lost during a failure (given that the transient transactions are not persisted). For example, persistency controller 125 may, as a default, buffer transactions, which do not reliably interact with an external system, such as application 105, but solely update internal state variables or are exclusively engaged in non-reliable (best-effort) interactions with external systems. The effects of these transient transactions are buffered, as described above with respect to transactions 220B-E. If a failure occurs, the effects of these transient transactions are lost and cannot be directly recovered from the database.

At 440, when a failure occurs, the transaction persisted to disk at a save point is read from the database to enable a roll back to the respective save point. The transaction including information, such as state variables and the like, are read from, for example, database 160 to enable a roll back to the save point. To recover the transient system state, the state correlation engine 145 then executes the remaining transactions using continuous execution of rules. For example, when a failure occurs at 310, the failure may result in the loss of data associated with transient transactions 220B-D. Nonetheless, persistency controller 125 recovers the system state by retrieving a transaction at the last save point 215 (e.g., transaction 220A stored at database 160). The state correlation engine 145 then executes transactions 320B-D (which represent a re-execution of the rules associated with transactions 220B-D) and any other subsequent transaction in the transaction chain.

Application 105 may be implemented as a business application. A business application may be mapped to rules both exclusively manipulating internal state and communicating with external components. For instance, business process models may comprise gateways that perform branching and synchronization or data transformations (e.g., Extensible Style sheet Language Transformations mappings), which purely act on internal data. Occasionally, external events (e.g., Web Services Reliable Messaging messages) are received or sent. In classifying the steps according to this criterion, performance enhancements may be achieved. In effect, persistent transactions are followed by a number of transient transactions, which typically reduces the number of database save points by, in some implementations, about an order of magnitude.

As used herein a disk refers to any storage medium which provides persistency, such as a disk drive, an optical storage device, and the like. As used herein, a transaction refers to a database transaction comprising a unit of interaction in a database. Specifically, a transaction may include a persistent database transaction that is used for enforcing a savepoint, or may include a transient internal transaction that stores its effects in an internal main-memory buffer. A roll back refers to a mechanism that allows discarding changes that have not been committed to a database and, thus, to return to the previous state. An update refers to an action (e.g., an operation) for implementation at a database, such as a create, a read, an update, a delete, and the like. As used herein, an external system may refer to any application or component (other than the rules processor) that interacts with the rule processor, and that interaction may also occur through an adapter. Moreover, although the description herein refers to events originating from, or sent to, an external application triggering a persistent transaction, as it is the need for reliability guarantees with the external system that typically prompts the save point for the persistent transaction. This is due to the fact that the external system delivers (or receives) events using database transactions.

Although persistency controller 125 is depicted at state correlation engine 145, persistency controller 125 may be located in other locations and distributed in a plurality of locations.

The subject matter described herein can be implemented in a computing system that includes a backend component (e.g., a data server), a middleware component (e.g., an application server), or a front end component (e.g., a client computer having a graphical user interface or a Web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet. The computing system can include clients and servers. A client and server are generally remote from each other in a logical sense and typically interact through a communication network. The relationship of client and server arises by virtue of computer programs running on the respective computers and having a client-server relationship to each other.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" may refer to any entity including a person or a computer.

The foregoing description is intended to illustrate but not to limit the scope of the invention, which is defined by the scope of the appended claims. Other embodiments are within the scope of the following claims.

What is claimed:

1. A computer-readable storage medium containing instructions to configure a processor to perform a method, the method comprising:
   processing, at a state correlation engine, a plurality of transactions bound to database transactions, the state correlation engine evaluating the plurality of transactions comprising an event, a condition, and an action;
   determining whether a predetermined condition is true, the determining comprising identifying the predetermined condition as true when the at least one transaction includes at least one of the event being sent to an external application or the event being received from an external application;
   saving an effect of at least one of the transactions to a persistence when the predetermined condition has been determined to be true, or, when the predetermined condition has not been determined to be true, saving the effect to a buffer instead of to the persistence, the effect comprising a state variable change caused at least in part by the action; and
   reading the at least one transaction from the persistence to enable a re-execution of rules representing the other transactions, when a failure occurs causing a recovery.

2. The computer-readable storage medium of claim 1, wherein saving the effect comprises:
   saving the effect of the at least one transaction to the persistence, when an interaction includes a reliability guarantee, wherein the interaction includes at least one of the event being sent to an external application or the event being received from an external application, and, wherein the reliability guarantee includes reliable messaging.

3. The computer-readable storage medium of claim 1, wherein the buffer comprises:
   a main memory buffer configured to transiently retain the effects of other transactions.

4. The computer-readable storage medium of claim 1, wherein reading comprises:
   continuously re-executing rules representing the other transient transactions.

5. The computer-readable storage medium of claim 1, wherein the predetermined condition further comprises a true condition when reliable messaging is used, the reliable messaging comprising web services reliable messaging protocol.

6. The computer-readable storage medium of claim 1, wherein the predetermined condition further comprises a true condition when reliable messaging is used, the reliable messaging comprising web services transactions protocol.

7. A system comprising:
   a processor; and
   a memory, the processor and memory configured to provide a method comprising:
   processing, at a state correlation engine, a plurality of transactions bound to database transactions, the state correlation engine evaluating the plurality of transactions comprising an event, a condition, and an action;
   determining whether a predetermined condition is true, the determining comprising identifying the predetermined condition as true when the at least one transaction includes at least one of the event being sent to an external application or the event being received from an external application;
   saving an effect of at least one of the transactions to a persistence when the predetermined condition has been determined to be true, or, when the predetermined condition has not been determined to be true, saving the effect to a buffer instead of to the persistence, the effect comprising a state variable change caused at least in part by the action; and reading the at least one transaction from the persistence to enable a re-execution of rules representing the other transactions, when a failure occurs causing a recovery.

8. The system of claim 7, wherein saving the effect comprises:

saving the effect of the at least one transaction to the persistence, when an interaction includes a reliability guarantee, wherein the interaction includes at least one of the event being sent to an external application or the event being received from an external application, and, wherein the reliability guarantee includes reliable messaging.

9. The system of claim 7, wherein the buffer comprises:
a main memory buffer configured to transiently retain the effects of other transactions.

10. The system of claim 7, wherein reading comprises:
continuously re-executing rules representing the other transient transactions.

11. A computer-implemented method comprising:

processing, at a state correlation engine, a plurality of transactions bound to database transactions, the state correlation engine evaluating the plurality of transactions comprising an event, a condition, and an action;

determining whether a predetermined condition is true, the determining comprising identifying the predetermined condition as true when the at least one transaction includes at least one of the event being sent to an external application or the event being received from an external application;

saving an effect of at least one of the transactions to a persistence when the predetermined condition has been determined to be true, or, when the predetermined condition has not been determined to be true, saving the effect to a buffer instead of to the persistence, the effect comprising a state variable change caused at least in part by the action; and reading the at least one transaction from the persistence to enable a re-execution of rules representing the other transactions, when a failure occurs causing a recovery.

12. The method of claim 11, wherein saving the effect comprises:

saving the effect of the at least one transaction to the persistence, when an interaction includes a reliability guarantee, wherein the interaction includes at least one of the event being sent to an external application or the event being received from an external application, and, wherein the reliability guarantee includes reliable messaging.

13. The method of claim 11, wherein the buffer comprises:
a main memory buffer configured to transiently retain the effects of other transactions.

14. The method of claim 11, wherein reading comprises:
continuously re-executing rules representing the other transient transactions.

* * * * *